(12) United States Patent
Mitchell et al.

(10) Patent No.: US 12,392,423 B2
(45) Date of Patent: Aug. 19, 2025

(54) DOWNHOLE VALVE WITH ROTATIONAL POSITION SENSOR

(71) Applicant: Halliburton Energy Services, Inc., Houston, TX (US)

(72) Inventors: David Lyall Mitchell, Singapore (SG); Michael Linley Fripp, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 84 days.

(21) Appl. No.: 18/116,054

(22) Filed: Mar. 1, 2023

(65) Prior Publication Data
US 2024/0295158 A1    Sep. 5, 2024

(51) Int. Cl.
*F16K 37/00* (2006.01)
*E21B 34/06* (2006.01)
*E21B 47/09* (2012.01)
*E21B 47/092* (2012.01)

(52) U.S. Cl.
CPC .......... *F16K 37/0041* (2013.01); *E21B 34/06* (2013.01); *E21B 47/09* (2013.01); *E21B 47/092* (2020.05); *F16K 37/0033* (2013.01)

(58) Field of Classification Search
CPC .. F16K 37/0033; F16K 37/0041; E21B 34/06; E21B 34/12; E21B 47/09; E21B 47/092; E21B 2200/04; E21B 2200/05
See application file for complete search history.

(56) References Cited

U.S. PATENT DOCUMENTS

| | | | |
|---|---|---|---|
| 5,063,775 A | 11/1991 | Walker, Sr. et al. | |
| 5,444,369 A | 8/1995 | Luetzow | |
| RE40,523 E | 9/2008 | Miyata et al. | |
| 9,163,747 B2 | 10/2015 | Dolenti et al. | |
| 9,671,211 B2 | 6/2017 | Gao et al. | |
| 9,822,611 B2 | 11/2017 | Delzell et al. | |
| 10,626,585 B1* | 4/2020 | Sullivan ............... | F16K 15/03 |
| 10,732,008 B2* | 8/2020 | Takiguchi ............ | F16K 37/0033 |
| 11,739,860 B2* | 8/2023 | Sapija .................. | H01H 3/16 |
| | | | 137/553 |
| 2001/0035510 A1* | 11/2001 | Oh ....................... | F16K 37/0041 |
| | | | 251/129.03 |

(Continued)

FOREIGN PATENT DOCUMENTS

| | | | |
|---|---|---|---|
| AU | 2013221693 | 8/2013 | |
| CN | 104455693 A * | 3/2015 | ............. E21B 34/12 |
| WO | 2020086065 | 4/2020 | |

OTHER PUBLICATIONS

Machine English translation of CN104455693 (Year: 2024).*

(Continued)

*Primary Examiner* — Hailey K. Do
(74) *Attorney, Agent, or Firm* — Scott Richardson; C. Tumey Law Group PLLC

(57) ABSTRACT

A flow control system for a well may include a valve body sized to fit in a wellbore and defining a valve body through bore. A valve closure is movably coupled to the valve body and moveable about a rotational axis between an open position allowing flow through the valve body through bore and a closed position closing flow through the valve body through bore. A rotational sensor generates a signal responsive to a rotational position of the valve closure relative to the valve body.

19 Claims, 5 Drawing Sheets

(56) References Cited

U.S. PATENT DOCUMENTS

| | | |
|---|---|---|
| 2003/0033868 A1* | 2/2003 | Posey ................. F16K 37/0041 |
| | | 324/207.11 |
| 2004/0163809 A1 | 8/2004 | Mayeu et al. |
| 2006/0157240 A1 | 7/2006 | Shaw et al. |
| 2013/0341034 A1 | 12/2013 | Biddick et al. |
| 2017/0247960 A1 | 8/2017 | Kyle et al. |
| 2020/0011168 A1 | 1/2020 | Chen et al. |
| 2020/0173258 A1 | 6/2020 | MacDougall et al. |
| 2022/0018459 A1* | 1/2022 | Sapija ................. F16K 37/0083 |

OTHER PUBLICATIONS

International Search Report and Written Opinion for International Patent Application No. PCT/US2023/016142 dated Nov. 23, 2023. PDF file. 9 pages.

\* cited by examiner

DOWNHOLE VALVE WITH ROTATIONAL POSITION SENSOR

BACKGROUND

The present disclosure relates generally to downhole valve position sensing systems, downhole valves, and methods to determine a position of a downhole valve.

Wellbores are sometimes drilled into subterranean formations to allow for the extraction of hydrocarbons and other materials. Valves are sometimes disposed in a wellbore and are utilized during one or more well operations to restrict fluid flow through the wellbore.

BRIEF DESCRIPTION OF THE DRAWINGS

These drawings illustrate certain aspects of some of the embodiments of the present disclosure and should not be used to limit or define the method.

DETAILED DESCRIPTION

A flow control system for a well is disclosed that may allow for precise determination of a valve position. The flow control system may include a downhole valve, such as a flapper valve or ball valve, having a closure that is rotatable to open and close flow through a valve body. The flow control system may also include a valve position sensing system that can sense the rotational position of the closure (e.g., flapper or ball), such as open, fully open, closed, and fully closed, and/or by measuring and outputting the angle of the closure. The valve position sensing system may include a rotational sensor that senses one or more feature (i.e., sensed features) of rotating components. In one example, a position sensor on one of the valve body and valve closure is positioned to detect movement of a sensed feature on the other of the valve body and the valve closure. For example, an electromagnetic sensor on the valve body may detect the rotational position (e.g., angle and/or distance) of a magnet on the valve closure with respect to the position of the sensor. In some examples, a profile may be defined that revolves about a rotational axis, and a variation along that profile is detectable.

Knowing the position of subsurface safety valves, barrier valves, and the like will help ensure that these valves are completely open or completely closed. Being fully open helps to ensure, for example, that there is no restriction to production flow, as well as to ensure that there are no valve lips that could catch a tool string. Being completely closed likewise helps to ensure that the valve is sealing properly without appreciable leakage.

Figure 1:
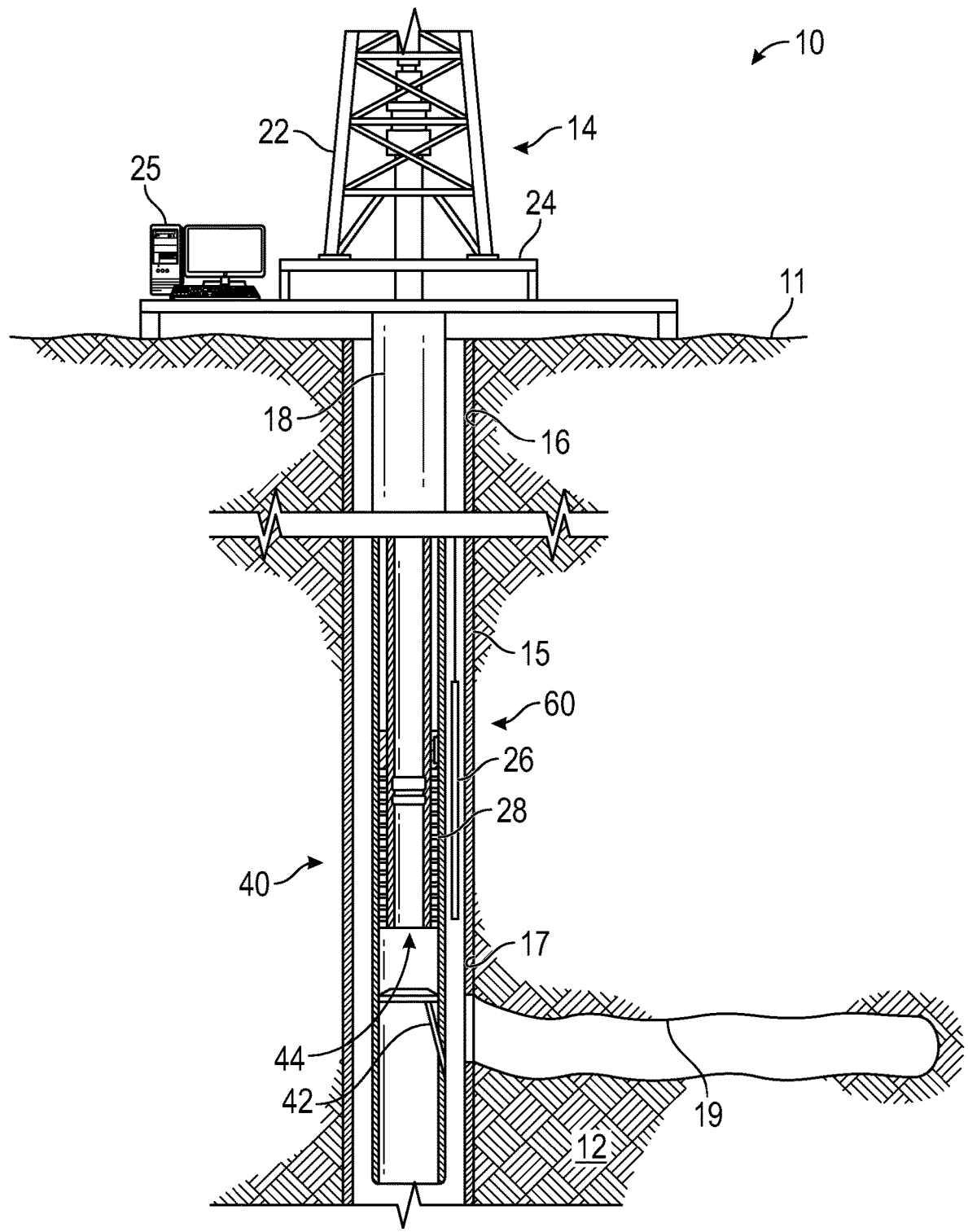
FIG. 1 is an elevation view of a well system as an example of a well environment for implementing a valve position sensing system according to aspects of this disclosure.

FIG. 1 is an elevation view of a well system 10 as an example of a well environment for implementing a valve position sensing system 60 according to aspects of this disclosure. The operating environment of the well system 10 includes a rig 14 positioned on the earth's surface 11 and extending over and around a wellbore 16. The rig 14 may represent any type of rig for supporting operations in a wellbore during drilling, completion, production, and/or maintenance, e.g., workovers. The well system 10 and rig 14 are depicted as being land-based, but may alternatively represent other types of environments such as an offshore well system, in which case the rig 14 may represent an offshore platform or floating vessel in a body of water (e.g., the ocean, not shown) and the earth's surface 11 may represent a seabed below which the wellbore 16 has been formed. The wellbore 16 extends into a subterranean formation 112 that has been formed by drilling for recovering hydrocarbons, or for injecting fluids into a spent formation 112. The wellbore 16 may follow any wellbore trajectory including sections that deviate from vertical, as formed by any suitable techniques such a directional drilling or multi-lateral techniques. By way of example, FIG. 1 includes a vertical portion 17 directly extending from the surface 11 and a deviated portion 19 branching off the vertical portion 17. The vertical portion 17 is partially cased by a casing 15, which could also be extended through the horizontal portion 19.

A tubular conveyance 18 is suspended from the rig 14 into the subterranean formation 112. Any suitable conveyance could be used that supports the flow of well fluids, including but not limited to drill pipe, casing, coiled tubing, and so forth. A downhole valve 40 is disposed within the tubular conveyance 18 to control flow up through the tubular conveyance 18. The downhole valve 40 is depicted, by way of example, as a flapper valve. However, other suitable valve types may alternatively be used, such as a ball valve, J-slot valve, or L-slot valve. The downhole valve 40 may be a subsurface safety valve (SSSV), or more specifically, a tubing-retrievable subsurface safety valve (TRSV) or wireline-retrievable subsurface safety valve (WRSV) for controlling the flow of production fluids up through the conveyance 18. The rig 14 includes a derrick 22 with a rig floor 24 through which the conveyance 18 extends into wellbore 16. In some embodiments, the rig 14 has a motor-driven winch and other associated equipment for extending tubular conveyance 18 into wellbore 16 to a selected depth. While FIG. 1 depicts a stationary rig 14 for land-based operations, alternative embodiments may include mobile workover rigs, wellbore servicing units (such as coiled tubing units), and the like used to lower tubular conveyance 18 into the wellbore 16.

The downhole valve 40 is sized to fit in the wellbore 16, with its through bore 44 aligned with the wellbore 16 to control the flow of formation fluids. For example, an SSSV can open flow to a large volumetric flow rate of production fluids, and still shut down that flow in the event of an emergency. The flapper 42 is an example of a valve closure that may pivot between an open position as shown for allowing flow through the downhole valve 40 and a closed position for closing flow. The flapper 42 may be normally propped open with an actuation member 28, e.g., a piston to directly or indirectly engage the flapper 42. The flapper 42 may be biased to a closed position for automatically closing when the actuation member 28 is not engaging the flapper 42.

The valve position sensing system 60 includes a rotational sensor, with any of a variety of example configurations discussed below, to sense a rotational position of the flapper 42 or other valve closure type depending on the valve configuration. For example, the valve position sensing system 60 may at least determine whether the downhole valve 40 is open or closed based on the rotational position of the flapper 42. The valve position sensing system 60 may be used to confirm, more particularly, whether the downhole valve 40 is fully open or fully closed, and to alert the operator or take some other action when it is not. Being fully open helps to ensure, for example, that there is no restriction to production flow, as well as to ensure that there are no valve lips that could catch a tool string. Being fully closed likewise helps to ensure that the valve is sealing properly without appreciable leakage.

Generally, the valve position sensing system 60 may include sensor hardware responsive to rotational position and a change in rotational position (movement) of the flapper or other valve closure. The valve position sensing system 60 may include a processor and control logic to interpret a sensor signal, such as to ascertain a rotational position of the valve closure as it correlates with the sensor signal and to output a representation of the rotational position of the valve closure in relation to the signal.

A variety of example sensor configurations are given below, which in most cases may comprise an electromagnetic sensor. In some examples the sensor is an electromagnetic sensor used to sense the angle of a directional magnetic field. In other examples, a proximity sensor is used to determine how far away a reference point on a valve closure is from a valve body to infer its rotational position. The processor may be located in a downhole housing, or at surface 11. For example, an information handling system 25 is optionally provided at the well site or at a remote location in communication with the valve position sensing system 60. The information handling system 25 may include user input/output (I/O) peripherals, a process, control logic such as hardware, software, or firmware for processing and outputting information from the valve position sensing system 60, such as to determine and display when the downhole valve 40 is open or closed or its precise rotational position. The information handling system 25 may be configured to control other system components based on its analysis of the rotational position.

Figure 2:
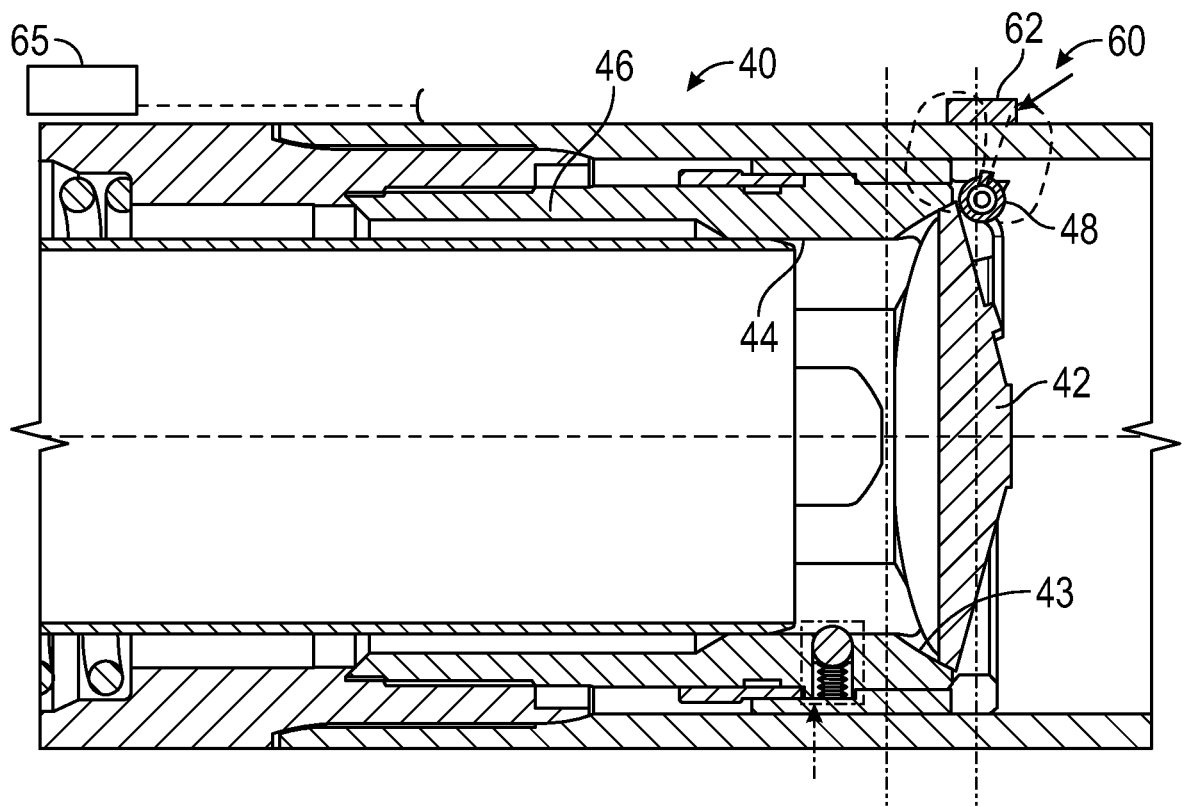
FIG. 2 is an enlarged side view of a flapper valve and valve position sensing system according to an example configuration.

FIG. 2 is an enlarged side view of the downhole valve 40 and valve position sensing system 60 according to an example configuration. The downhole valve 40 includes a tubular valve body 46 defining a valve body through bore 44 and a flapper 42 pivotably coupled to the valve body 46 by a hinge 48. The flapper 42 thus functions as a valve closure disposed within the valve body 46 that is pivotable between the open position of FIG. 1 and a closed position as shown in FIG. 2. The flapper 42 may be in a fully closed position in FIG. 2, forming a reliable seal with a valve seat 43.

Over time, various downhole factors may result in the flapper 42 not fully closing, such as due to general wear and tear, corrosion, or debris accumulated on the valve seat 43 or about the hinge 48. The valve position sensing system 60 includes a rotational sensor 62 to generate a signal 61 responsive to a rotational position of the flapper 42 relative to the valve body 46. The valve position sensing system 60 includes a controller schematically depicted at 65 in communication with the rotational sensor 62. The controller 65 includes a processor and control logic to process and interpret the signal 61 from the rotational sensor 62. The valve position sensing system 60 is thereby able to determine, for example, when the flapper 42 is open or closed, including to confirm when it is in a fully open or fully closed position, and may optionally be able to determine and output an accurate angle reading. The processor is configured to output a representation of a rotational position of the flapper 42 or other valve closure in relation to the signal 61.

A range of possible configurations are possible using a magnetic rotational sensor. The magnetic rotational sensor may comprise a magnet on one of the valve closure and the valve body and a magnetic sensor on the other of the valve closure and the valve body. Thus, movement of the valve closure relative to the valve body results in a corresponding movement of the magnet with respect to the magnetic sensor. The magnetic sensor may sense this movement of the magnet and generate a signal responsive thereto. The magnetic sensor may sense the position and the movement of the magnet by noting the magnitude of the magnetic signal, the direction of the magnetic signal, or the combination of two or more magnetic sensors. The magnetic sensor may be used to thereby obtain (e.g., by inference or correlation) the rotational position of the valve closure based on the signal.

Figure 3:
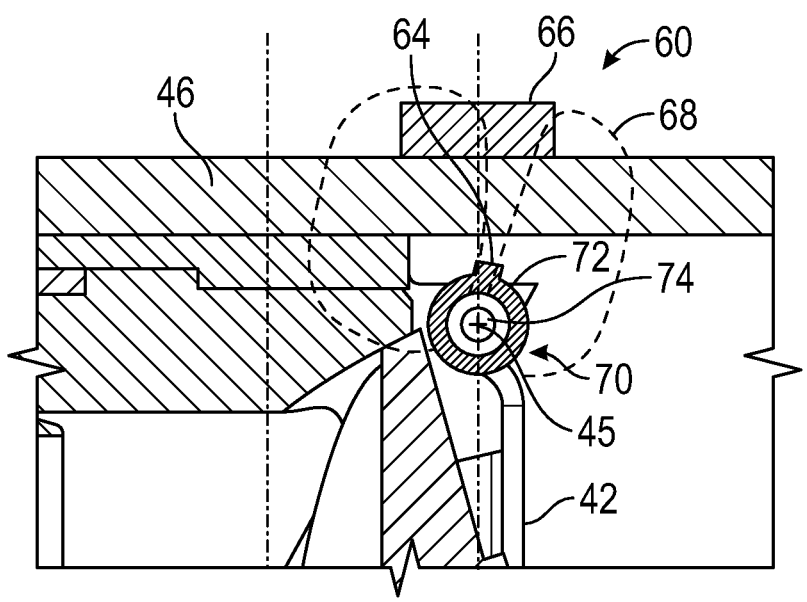
FIG. 3 is a further enlarged view of the system of FIG. 2 according to an example configuration that employs a magnetic rotational sensor.

FIG. 3 is a further enlarged view of the valve position sensing system 60 of FIG. 2 according to an example configuration that employs a magnetic rotational sensor. The valve closure (in this case, the flapper 42) is pivotably coupled to the valve body with a hinge 70. The hinge 70 includes a knuckle 72 and a pin 74 received within the knuckle 72. The hinge 70 allows the flapper 42 to pivot about a rotational axis 45, which is approximately aligned with the pin 74 and/or center of the knuckle 72. The knuckle 72 is incorporated with or otherwise secured to the flapper 42 and the pin 74 is secured to the valve body 46, or vice-versa, such that the knuckle 72 revolves about the pin 74 as the flapper 42 correspondingly rotates with respect to the valve body 46. In this example, the magnet 64 is coupled to the flapper 42 via the magnet 64 being located on the knuckle 72. The rotational sensor 62 thereby determines the rotational position of the flapper 42 about the rotational axis 45 based on a position of the magnet 64 with respect to the magnetic sensor 66. In an alternative configuration, a magnet could be incorporated into the pin 74 and a magnetic sensor incorporated into the knuckle 72, again so that the rotational sensor determines the rotational position of the flapper 42 about the rotational axis 45 based on a position of the magnet with respect to the magnetic sensor.

Depending on the configuration, a magnetic sensor may detect movement of a magnet based on an angle of the magnet and/or a distance of the magnet with respect to the magnetic sensor. In the example of FIG. 3, the magnet 64 generates a directional magnetic field schematically drawn at 68. The magnetic sensor 66 is responsive to a change in an angle of the directional magnetic field 68. As the flapper 42 pivots at the hinge 70, the knuckle 72 rotates about the pin 74 in conjunction with the pivoting of the flapper 42 with respect to the valve body 46. Thus, by detecting the angle or change in angle of the magnetic field 68, the magnetic sensor 66 may be used to determine the precise angle of the flapper 42. By determining the angle of the magnetic field 68, and thereby the flapper 42, the valve position sensing system 60 is able to determine if the flapper 42 is fully open, fully closed, or even determine a measurement of the angle of the flapper 42.

In some examples, a proximity sensor has a sensor location on the valve body or the valve closure. A feature being sensed by the proximity sensor as a sensed location on the other of the valve body or the valve closure. The proximity sensor thereby senses a changing proximity between the sensor location and the sensed location.

In some of these examples, the sensor location may be a fixed location on the valve body or the valve closure. The sensed location may be a fixed location on the other of the valve body or the valve closure. A distance between the two fixed location varies in relation to movement of the closure. Thus, the rotational sensor may infer the rotational position of the valve closure from that distance between fixed positions.

For example, in FIG. 3, instead of the magnetic sensor 66 being responsive to the angle of the magnetic field 68, the magnetic sensor 66 may alternatively be a proximity sensor responsive to a distance of the magnet 64 from the magnetic sensor 66. The magnetic sensor 66 is at a fixed position on the knuckle 72, and therefore at a fixed position with respect to the flapper 42. Since the strength of a magnetic field may vary with distance, a magnetic proximity sensor may be used to infer the distance between the fixed locations based on a strength of the detected magnetic field. Thus, as the flapper 42 pivots, the distance between the magnet 64 and the magnetic sensor 66 and the corresponding strength of the magnetic field 68 vary, so that the strength of the magnetic field 68 detected by the magnetic sensor 66 could be used to determine the angle of the flapper 42.

In other examples, a proximity sensor may be used to detect proximity of a sensor element to a profile defined by one of the valve components about the rotational axis, but not necessarily to a fixed location on that profile. As the valve closure moves, the profile rotates around the rotational axis and moves past the sensor element. The sensor element may detect variations along the profile as the profile moves past the sensor element. That information may be analyzed to ascertain the rotational position of the valve closure.

In the above example, the proximity sensor is based on a magnetic field, which is one example of a variable electrical parameter. A proximity sensor may alternatively sense other electrical parameters that changes in response to the changing proximity. For instance, the electrical parameter may alternatively comprise an inductance, a capacitance, a resistance, and/or a voltage, which change with the rotational position of the valve closure with respect to the valve body. By sensing the changed electrical parameter, the rotational sensor may determine the rotational position of the valve closure.

FIGS. 4-7 provide examples of profiles about a rotational axis that have detectable features along the profile. These profiles may be defined, for example, by the knuckle of a hinge (i.e., a knuckle profile) where the hinge rotatably couples the valve closure to the valve body. The flapper or other valve closure may be rigidly coupled to the knuckle, with the proximity sensor on the valve body so that rotating the valve closure moves the knuckle profile with respect to the proximity sensor. Although a hinge knuckle provides a useful structure for defining a profile about a rotational axis, these profiles may be alternatively defined by some structure of the valve closure or body other than by a hinge. In any of these examples, the profiles may be generally arcuate, e.g., circular or partially circular about the rotational axis, but with some detectable variation.

Figure 4:
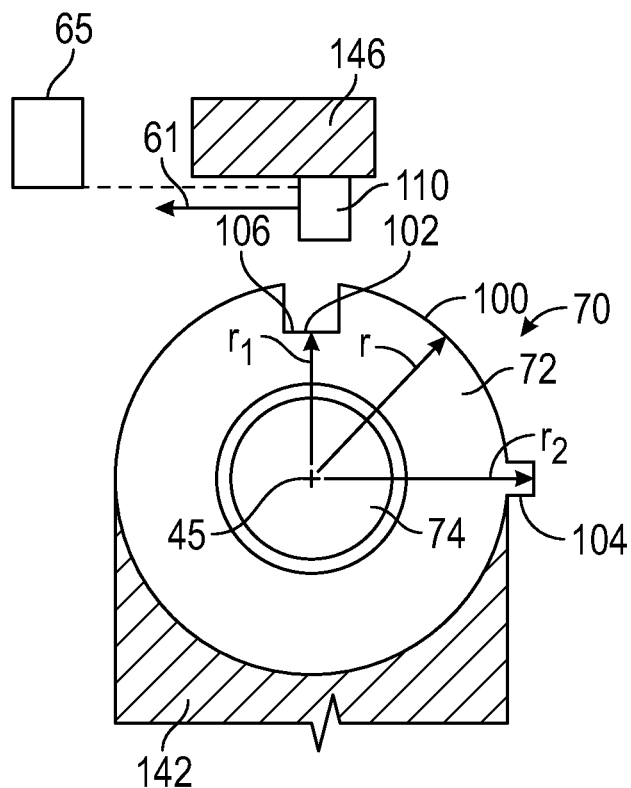
FIG. 4 is a diagram of a first example profile defined by the knuckle of a hinge used to mount the flapper to the valve body.

FIG. 4 is a diagram of a first example profile 100 defined, by way of example, by the knuckle 72 of a hinge 70 used to mount a valve closure 142 to a valve body 146. The valve closure may be the flapper of a flapper valve or the ball of a ball valve, for example. A proximity sensor comprises a sensor element 110 in proximity to the profile 100. The sensor element 110 may be coupled to a fixed location on the valve body 40. The knuckle 72 may be incorporated on or otherwise secured to the valve closure 142. The knuckle 72 may rotate about the pin 74 as the valve closure 142 is moved about the corresponding rotational axis 45. The sensor element 110 is responsive to a variation along the knuckle profile 100 as the knuckle 72 rotates relative to the sensor element 110. The knuckle profile 100 comprises a radius "r" that varies along the profile from a radius "$r_1$" at a first knuckle portion 102 to a radius "$r_2$" at a second knuckle portion 104 circumferentially spaced from the first knuckle portion 102.

In this example, the first knuckle portion 102 comprises a recess and the second knuckle portion 104 comprises a protrusion. The sensor element 110 is responsive to the recess or protrusion based on proximity of the profile 100 to the sensor element 110. The two knuckle portions 102, 104 are associated with different positions of the flapper or other valve closure 142. For example, the first knuckle portion 102 may be proximate to the sensor element 110 when the closure element 142 is in the closed position and the second knuckle portion 104 may be proximate to the proximity sensor element when the closure element is in the open position, or vice-versa. Thus, the controller 65 may determine whether the valve is open or closed based on whether the recess at the first location 102 or protrusion at the second location 104 are adjacent to the sensor element 110.

Figure 5:
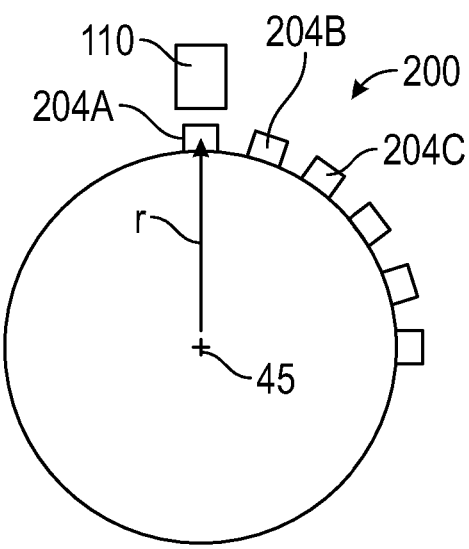
FIG. 5 is a diagram of a second example profile comprising a plurality of circumferentially spaced protrusions.

FIG. 5 is a diagram of a second example profile 200 comprising a plurality of circumferentially spaced protrusions 204A, 204B, 204C, etc. Each protrusion 204 corresponds to a different angular position of a valve closure. For example, one of these protrusions may correspond to a fully open position, another of these protrusions may correspond to a fully closed position, and other protrusions in between may correspond to open positions, such as positions of reduced flow that is less than in the fully open position. As the profile 200 rotates about the rotational axis 45, the protrusions 204 successively pass under the sensor element 110. The sensor element 110 may be configured to sense the proximity each protrusion 204. The protrusions 204 may all have an equal radius r, in which case the sensor element 110 can be configured to detect a rotational direction as the protrusions 204 pass by the sensor element 110, to keep track of the rotational position. Alternatively, the protrusions 204 may all be given a unique radius so the sensor element 110 may ascertain based on radius which protrusion 204 is adjacent to the sensor element 110, and the corresponding rotational position. The sensor element 110 could alternatively be configured to detect the circumferentially-spaced recesses (reduced radius) between adjacent protrusions.

Figure 6:
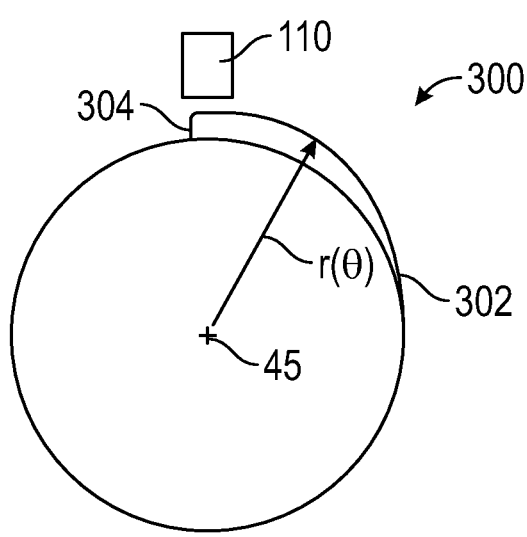
FIG. 6 is a diagram of a third example profile whose radius varies gradually in a circumferential direction over a portion of the profile.

FIG. 6 is a diagram of a third example profile 300 whose radius "r" varies gradually over a portion of the profile 300. The varying radius r correlates with an angular position (θ) of the valve closure so that the radius increases in one circumferential direction and decreases in an opposing circumferential direction. The profile 300 may be generally circular and fully encircle the rotational axis 45, such as might be the case with the knuckle of a hinge about a pin as discussed above. However, the profile 300 is not required to fully encircle the rotational axis 45. Rather, the profile 300 could instead extend only partially around the rotational axis 45. For example, a flapper-type closure or ball-type closure may travel on the order of about ninety degrees between a fully open position and a fully closed position, in which case the profile or at least a detectable portion of the profile 300 may only span a like amount. In FIG. 6 the profile 300 extends three-hundred-and-sixty degrees about the rotational axis 45, but only about ninety degrees of that profile 300 passes adjacent to the sensor element 110 from a first location 302 corresponding to fully open to a second location 304 corresponding to fully closed. The sensor element 110 senses its proximity to the profile 300 and is used to obtain the angular position (θ) therefrom. In one variation, the profile 300 may contact the electromagnetic sensor 110 so that it can create a low resistance electrical connection.

Figure 7:
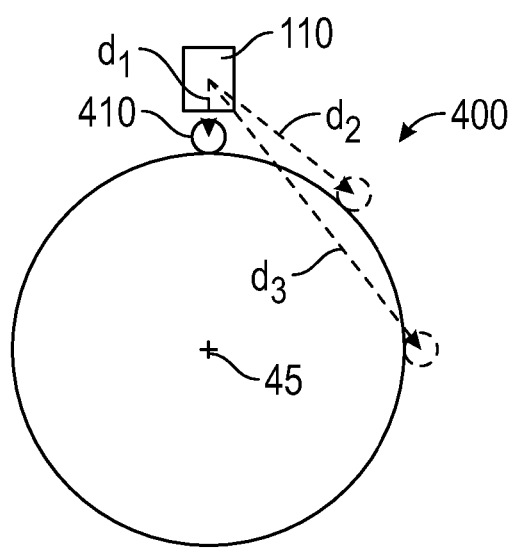
FIG. 7 is diagram of a fourth example profile having a sensed feature at a fixed location along the profile.

FIG. 7 is diagram of a fourth example profile 400 having a sensed feature at a fixed location along the profile 400. The sensed feature in this example may be a magnet 410 (e.g., the magnet 64 in FIG. 3). A surrounding portion of the profile 400 may be non-magnetic or otherwise have diminished magnetic properties, such that the sensor element 110 may detect the magnet 410 but not the non-magnetic portion of the profile 400. The sensor element 110 is at a fixed location, e.g., on a valve body. Thus, the sensor element 110 is responsive to a changing proximity between the sensor element 110 at its fixed location and the magnet 410 at its fixed location as the profile 400 rotates about the rotational axis 45.

In FIG. 7, the magnet 410 is aligned with the sensor element 110, at a minimum distance "$d_1$" between the sensor element 110 and the magnet 410. This may correspond to a maximum or minimum travel, e.g., with a fully open or fully closed position of a valve closure. As the valve closure moves, so too the profile 400 will rotate, carrying the magnet progressively further from the sensor element 110. Although the magnet 410 moves along a circular path about the rotational axis 45, the signal strength may vary with the linear distance (straight-line path) "d" from the sensor element 110, which distances increases from $d_1$ to $d_2$ to $d_3$. The magnetic signal may vary with position, such as by correspondingly decreasing as the distance increases from $d_1$ to $d_2$ to $d_3$. Thus, the distance and corresponding signal strength may be correlated with angular position, so that the rotational position of the flapper, ball, or other valve closure element may be determined based on the signal.

Figure 8:
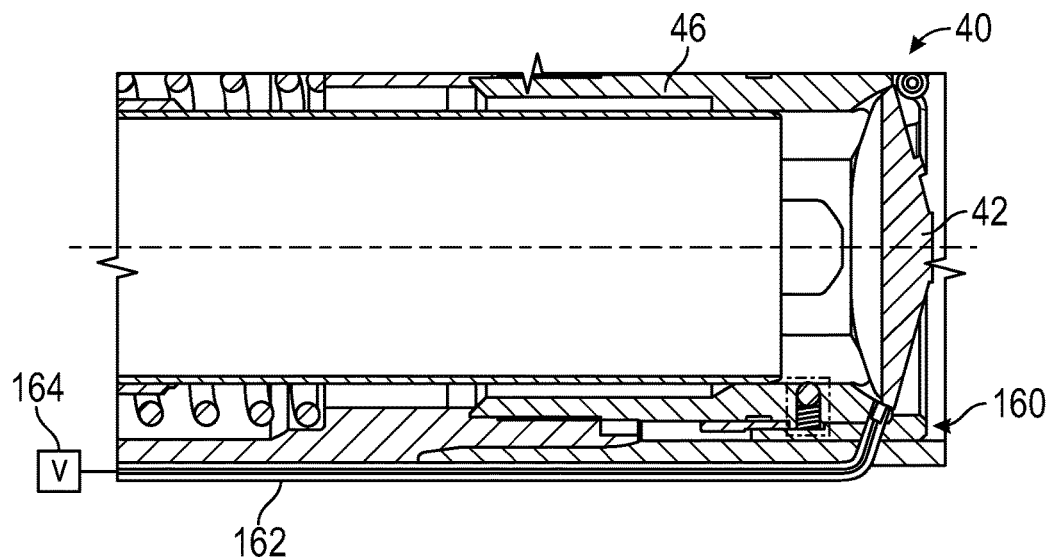
FIG. 8 is a sectional side view of the downhole valve with another example of a valve position sensing system.

FIG. 8 is a sectional side view of the downhole valve 40 with another example of a valve position sensing system 160. The downhole valve 40 is again depicted as a flapper valve by way of example. The valve position sensing system 160 senses the rotational position of the flapper 42 at least to the extent that it may detect whether the flapper 42 is open or closed, which the valve position sensing system 160 detects by virtue of whether an electrical circuit is open or closed. When open, little current flows. An electrical pathway 162 is routed along and insulated from the valve body. The electrical pathway 162 may comprise, for example, an insulated wire or a circuit trace routed along a non-conductive substrate pathway. A voltage source 164 is applied to the electrical pathway 162. One can apply voltage for a short time to avoid corrosion of the electrode. Voltage can be alternating current (AC) or direct current (DC).

The flapper 42 is metallic and electrically conductive, so the flapper 42 and the valve body 46 provide an electrical ground. Alternatively, an electrically conductive pathway may be incorporated into an otherwise electrically non-conductive portion of the flapper 42. In either case, an electrically conductive portion of the flapper 42, i.e., an electrical contact on the flapper 42, electrically contacts the electrical pathway 162 when the flapper 42 is closed. The valve position sensing system detects the completed circuit as indicative of the downhole valve 40 being closed.

An optional configuration could incorporate a proximity sensor on the valve body and a magnet or other feature on the flapper, to sense the proximity of the flapper to the closed position. For example, a proximity sensor could measure the distance to the flapper as the flapper is approaching the seat. As in other examples, the proximity sensor can be a magnetic, capacitive, inductive, or resistive sensor.

Figure 9:
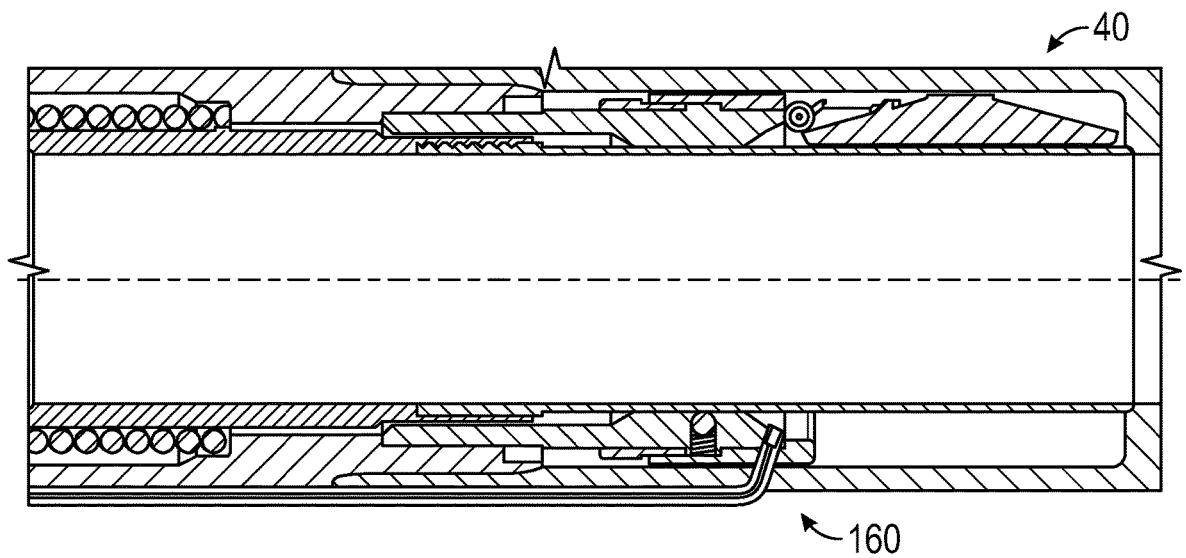
FIG. 9 is a sectional side view of the downhole valve of FIG. 8 with the flapper moved to an open position.

FIG. 9 is a sectional side view of the downhole valve 40 of FIG. 8 with the flapper 42 moved to an open position. This opens the electrical circuit, which the valve position sensing system 160 detects as indicative the downhole valve 40 is now open. By sensing the changed electrical parameter (in this case, a voltage), the valve position sensing system 160 detects the rotational position of the flapper 42.

Figure 10:
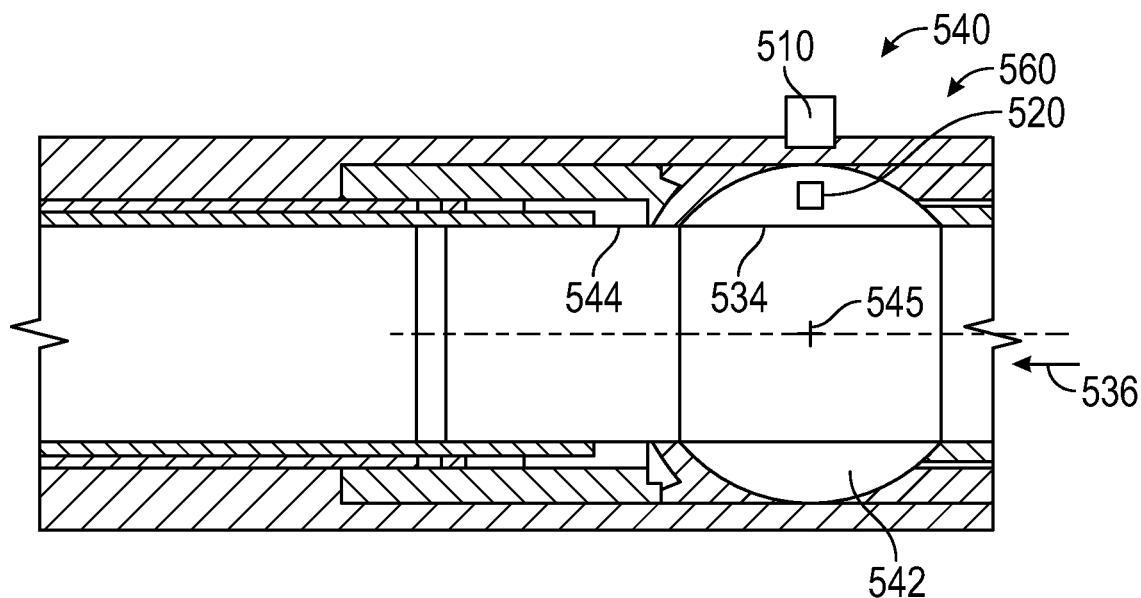
FIG. 10 is a sectional side views of a ball valve in an open position.
Figure 11:
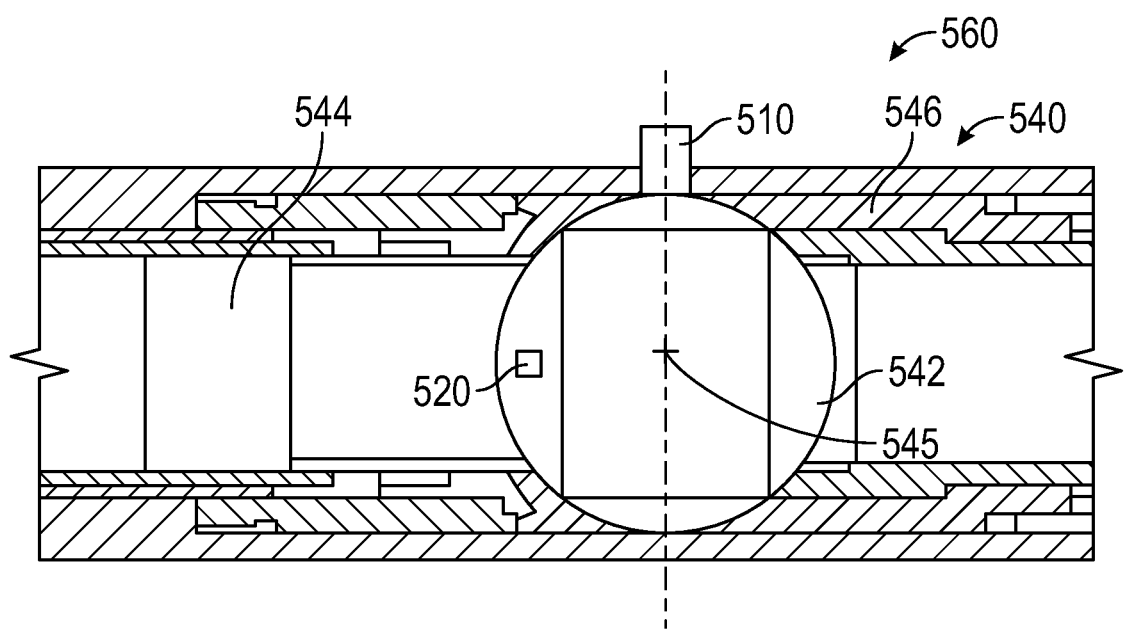
FIG. 11 is a sectional side view of the ball valve of FIG. 10 with the ball rotated to a closed position.

The above examples are discussed primarily in the context of a flapper valve. However, the disclosed principles may be applied to any other type of valves that has a valve closure rotatable between open and closed positions. FIGS. 10 and 11 are sectional side views of a ball valve 540 as another example of a downhole valve for use with a valve position sensing system 560 according to another example configuration.

FIG. 10 is a sectional side view of the ball valve 540 with a ball 542. The ball 542 defines a ball through bore 534 rotatable about a rotational axis 545, into and out of fluid communication with a valve body through bore 544. FIG. 10 shows the ball 542 in an open position in fluid communication with the valve body through bore 534, thus allowing any flow 536 through the valve body through bore 544. The valve position sensing system 560 includes a sensor element 510, which may be any of the types discussed above. For example, the sensor element 510 may comprise a magnetic sensor that detects a directional magnetic field, or a proximity sensor responsive to a changed electrical parameter (magnetic field, inductance, capacitance, and/or a voltage). By sensing proximity and/or the changed electrical parameter, the sensor element 510 serves as a rotational sensor to determine the rotational position of the ball 542. In the fully open position of FIG. 10, a sensed feature 520 (e.g., protrusion, recess, magnet, etc.) is in close proximity to the sensor element 510.

FIG. 11 shows the ball valve 540 of FIG. 10 with the ball 542 rotated out of fluid communication with the valve through bore 544 to a fully closed position, fully closing the flow 536 through the valve body through bore 544. The sensed feature 520 has been shifted to a maximal distance from the sensor element 510. The valve position sensing system 560 determines, at least by virtue of the sensed feature 520 moving away from the sensor element 510, that the ball 542 is no longer in the fully open position. More particularly, the sensor element 510 may determine, based on signal strength, the relative distance of the sensed feature from the sensor element 510, thereby inferring an angular position of the ball 542 in relation to that signal.

In other configurations, a profile such as any of the examples of FIGS. 4-7 may be provided about the rotational axis 545, such as defined by the valve body 546. The sensor element 510 may sense variations in that profile as it moves relative to the sensor element 510 to infer a rotational position of the ball 542.

Accordingly, the present disclosure may provide a flow control system for a well and a downhole valve for controlling flow in a well. The methods, systems, tools, etc. according to this disclosure may include any of the various features disclosed herein, including one or more of the following examples.

Example 1. A flow control system for a well, comprising: a valve body sized to fit in a wellbore and defining a valve body through bore; a valve closure coupled to the valve body and moveable about a rotational axis between an open position allowing flow through the valve body through bore and a closed position closing flow through the valve body through bore; and a rotational sensor to generate a signal responsive to a rotational position of the valve closure relative to the valve body.

Example 2. The flow control system of Example 1, wherein the valve closure comprise a flapper pivotably coupled to the valve body and pivotable about the rotational axis between the open position and the closed position.

Example 3. The flow control system of any of Examples 1 to 2, wherein the valve closure comprise a ball rotatably disposed within the valve body through bore about the rotational axis, the ball defining a ball through bore rotatable into and out of fluid communication with the valve body through bore.

Example 4. The flow control system of any of Examples 1 to 3, wherein the rotational sensor comprises a magnet on one of the valve closure and the valve body and a magnetic sensor on the other of the valve closure and the valve body such that the rotational sensor determines the rotational position of the valve closure about the rotational axis based on a position of the magnet with respect to the magnetic sensor.

Example 5. The flow control system of Example 4, wherein the magnet generates a directional magnetic field and the magnetic sensor is responsive to a change in an angle of the directional magnetic field.

Example 6. The flow control system of any of Examples 1 to 5, wherein the rotational sensor comprises a proximity sensor having a sensor location on the valve body or the valve closure to sense a changing proximity between the sensor location and a sensed location on the other of the valve body or the valve closure.

Example 7. The flow control system of Example 6, wherein the proximity sensor senses an electrical parameter that changes in response to the changing proximity.

Example 8. The flow control system of Example 7, wherein the electrical parameter comprises a magnetic field, an inductance, a capacitance, or a voltage.

Example 9. The flow control system of Example 6 or 7, wherein the sensor location is a fixed location on the valve body or the valve closure and the sensed location is a fixed location on the other of the valve body or the valve closure, and wherein the rotational sensor determines the rotational position of the valve closure from a distance between the fixed location on the valve body and the fixed location on the valve closure.

Example 10. The flow control system of any of Examples 1 to 9, wherein the valve body or valve closure define a profile about the rotational axis, wherein the rotational sensor is responsive to a variation along the profile as the valve closure moves between the open position and the closed position.

Example 11. The flow control system of any of Examples 1 to 10, wherein the valve closure is pivotably coupled to the valve body with a hinge comprising a knuckle and a pin, wherein the knuckle defines a knuckle profile about the pin and wherein the rotational sensor is responsive to a variation along the knuckle profile as the knuckle rotates relative to a sensor location.

Example 12. The flow control system of Example 11, wherein the variation along the knuckle profile comprises a radius that varies from a first knuckle portion to a second knuckle portion circumferentially spaced from the first knuckle portion.

Example 13. The flow control system of Example 12, wherein the knuckle is oriented with the first knuckle portion proximate to a proximity sensor element when the valve closure is in the closed position and with the second knuckle portion proximate to the proximity sensor element when the valve closure is in the open position.

Example 14. The flow control system of Example 12 or 13, wherein the first knuckle portion comprises a recess and the second knuckle portion comprises a protrusion.

Example 15. The flow control system of any of Examples 11 to 14, wherein the variation along the knuckle profile comprises a plurality of circumferentially spaced recesses or protrusions each corresponding to a different angular measurement.

Example 16. The flow control system of any of Examples 11 to 15, wherein the variation along the knuckle profile comprises a radius that gradually increases in one circumferential direction, such that the radius correlates with an angular position of the valve closure.

Example 17. The flow control system of any of Examples 11 to 16, further comprising a magnet at a fixed location along the knuckle profile, wherein the rotational sensor is responsive to a changing proximity between the magnet and a sensor location as the knuckle rotates about the pin.

Example 18. The flow control system of Example 1, wherein the rotational sensor comprises: an electrical pathway routed along and insulated from the valve body; a voltage source coupled to the electrical pathway; and an electrical contact on the valve closure that electrically contacts the electrical pathway to close an electrical circuit when the valve closure is closed and to open the electrical circuit when the valve closure is open.

Example 19. The flow control system of any of Examples 1 to 18, further comprising: an information handling system in communication with the rotational sensor and configured to output a representation of the rotational position.

Example 20. A downhole valve for controlling flow in a well, the downhole valve comprising: a valve body sized to fit in a wellbore and defining a valve body through bore; a valve closure pivotably coupled to the valve body with a hinge and moveable between an open position allowing flow through the valve body through bore and a closed position closing flow through the valve body through bore; the hinge comprising a knuckle and a pin defining a rotational axis for the valve closure, wherein the knuckle defines a knuckle profile that revolves about the pin as the valve closure moves between the open position and the closed position; a rotational sensor adjacent to the knuckle profile to generate a signal responsive to a variation in the knuckle profile as the knuckle profile revolves about the pin; and a processor configured to output a representation of a rotational position of the valve closure in relation to the signal.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A flow control system for a well, comprising:
   a valve body sized to fit in a wellbore and defining a valve body through bore;
   a valve closure coupled to the valve body and moveable about a rotational axis between an open position allowing flow through the valve body through bore and a closed position closing flow through the valve body through bore, wherein the valve closure comprise a flapper pivotably coupled to the valve body and pivotable about the rotational axis between the open position and the closed position;
   a hinge configured to pivotably couple the flapper of the valve closure to the valve body, wherein the hinge comprises a knuckle and a pin. wherein the knuckle defines a knuckle profile about the pin; and
   a rotational sensor to generate a signal responsive to a rotational position of the valve closure relative to the valve body, wherein the rotational sensor comprises a magnet and a magnetic sensor, wherein the magnet is disposed within a portion of the valve body, and wherein the magnetic sensor is disposed on an outer surface of the valve body, and wherein the rotational sensor is responsive to a variation along the knuckle profile as the knuckle rotates relative to a sensor location.

2. The flow control system of claim 1, wherein the valve body or valve closure define a profile about the rotational axis, wherein the rotational sensor is responsive to a variation along the profile as the valve closure moves between the open position and the closed position.

3. The flow control system of claim 1, wherein the variation along the knuckle profile comprises a plurality of circumferentially spaced recesses or protrusions each corresponding to a different angular measurement.

4. The flow control system of claim 1, wherein the variation along the knuckle profile comprises a radius that gradually increases in one circumferential direction, such that the radius correlates with an angular position of the valve closure.

5. The flow control system of claim 1, wherein the magnet is disposed at a fixed location along the knuckle profile, wherein the rotational sensor is responsive to a changing proximity between the magnet and a sensor location as the knuckle rotates about the pin.

6. The flow control system of claim 1, further comprising:
   an information handling system in communication with the rotational sensor and configured to output a representation of the rotational position.

7. The flow control system of claim 1, wherein the rotational sensor determines the rotational position of the valve closure about the rotational axis based on a position of the magnet with respect to the magnetic sensor.

8. The flow control system of claim 7, wherein the magnet generates a directional magnetic field and the magnetic sensor is responsive to a change in an angle of the directional magnetic field.

9. The flow control system of claim 1, wherein the variation along the knuckle profile comprises a radius that varies from a first knuckle portion to a second knuckle portion circumferentially spaced from the first knuckle portion.

10. The flow control system of claim 9, wherein the knuckle is oriented with the first knuckle portion proximate to a proximity sensor element when the valve closure is in the closed position and with the second knuckle portion proximate to the proximity sensor element when the valve closure is in the open position.

11. The flow control system of claim 9, wherein the first knuckle portion comprises a recess and the second knuckle portion comprises a protrusion.

12. The flow control system of claim 1, wherein the rotational sensor comprises a proximity sensor having a sensor location on the valve body or the valve closure to sense a changing proximity between the sensor location and a sensed location on the other of the valve body or the valve closure.

13. The flow control system of claim 12, wherein the sensor location is a fixed location on the valve body or the valve closure and the sensed location is a fixed location on the other of the valve body or the valve closure, and wherein the rotational sensor determines the rotational position of the valve closure from a distance between the fixed location on the valve body and the fixed location on the valve closure.

14. The flow control system of claim 12, wherein the proximity sensor senses an electrical parameter that changes in response to the changing proximity.

15. The flow control system of claim 14, wherein the electrical parameter comprises a magnetic field, an inductance, a capacitance, or a voltage.

16. A flow control system for a well, comprising;
   a valve body sized to fit in a wellbore and defining a valve body through bore;
   a valve closure coupled to the valve body and moveable about a rotational axis between an open position allowing flow through the valve body through bore and a closed position closing flow through the valve body through bore, wherein the valve closure comprise a flapper pivotably coupled to the valve body and pivotable about the rotational axis between the open position and the closed position:
   a hinge configured to pivotably couple the flap der of the valve closure to the valve body;
   a rotational sensor to generate a signal responsive to a rotational position of the valve closure relative to the valve body, wherein the rotational sensor comprises a magnet and a magnetic sensor, wherein magnet is disposed within a portion of the valye body, and wherein the magnetic sensor is disposed on an outer surface of the valve body;
   an electrical pathway routed along and insulated from the valve body;
   a voltage source coupled to the electrical pathway; and
   an electrical contact on the valve closure that electrically contacts the electrical pathway to close an electrical circuit when the valve closure is closed and to open the electrical circuit when the valve closure is open.

17. A downhole valve for controlling flow in a well, the downhole valve comprising:
   a valve body sized to fit in a wellbore and defining a valve body through bore;
   a valve closure pivotably coupled to the valve body with a hinge and moveable between an open position allowing flow through the valve body through bore and a closed position closing flow through the valve body through bore;

the hinge comprising a knuckle and a pin defining a rotational axis for the valve closure, wherein the knuckle defines a knuckle profile that revolves about the pin as the valve closure moves between the open position and the closed position;

a rotational sensor adjacent to the knuckle profile to generate a signal responsive to a variation in the knuckle profile as the knuckle profile revolves about the pin, and wherein the variation along the knuckle profile comprises a radius that gradually increases in one circumferential direction, such that the radius correlates with an angular position of the valve closure.

18. The flow control system of claim 1, wherein the magnet is secured to the hinge.

19. The flow control system of claim 1, wherein the magnet is secured to the flapper of the valve closure.

* * * * *